(12) United States Patent
Yamagishi

(10) Patent No.: US 7,353,042 B2
(45) Date of Patent: Apr. 1, 2008

(54) WIRELESS CALL SYSTEM

(75) Inventor: Junichi Yamagishi, Tokyo (JP)

(73) Assignee: Unirec Co., Ltd., Tokyo (JP)

( * ) Notice: Subject to any disclaimer, the term of this patent is extended or adjusted under 35 U.S.C. 154(b) by 502 days.

(21) Appl. No.: 09/935,222

(22) Filed: Aug. 22, 2001

(65) Prior Publication Data
US 2002/0183031 A1 Dec. 5, 2002

(30) Foreign Application Priority Data
May 31, 2001 (JP) ............... 2001-165592

(51) Int. Cl.
H04M 1/00 (2006.01)
H04B 7/00 (2006.01)
H04N 7/18 (2006.01)
H04N 9/47 (2006.01)

(52) U.S. Cl. .................. 455/556.1; 455/66.1; 379/159; 348/143

(58) Field of Classification Search ............... 455/3.05, 455/3.06, 41.2, 569.1, 556.1, 66.1, 90.1; 340/311.2, 313; 379/428, 440, 102.01, 102.06, 379/14.01, 14.02, 14.05, 14.06, 159; 348/14.01, 348/14.02, 14.05, 14.06, 143; 382/124; 341/22
See application file for complete search history.

(56) References Cited

U.S. PATENT DOCUMENTS

| | | | | |
|---|---|---|---|---|
| 5,428,388 | A * | 6/1995 | von Bauer et al. | 348/155 |
| 5,657,380 | A * | 8/1997 | Mozer | 379/88.01 |
| 5,920,640 | A | 7/1999 | Salatino et al. | |
| 6,094,213 | A * | 7/2000 | Mun et al. | 348/14.05 |
| 6,100,811 | A | 8/2000 | Hsu et al. | |
| 6,256,479 | B1 * | 7/2001 | Hoffmann et al. | 455/78 |
| 6,272,562 | B1 * | 8/2001 | Scott et al. | 710/16 |
| 6,337,856 | B1 * | 1/2002 | Schanhals et al. | 370/352 |
| 6,429,893 | B1 * | 8/2002 | Xin | 348/155 |
| 6,466,261 | B1 * | 10/2002 | Nakamura | 348/151 |

(Continued)

FOREIGN PATENT DOCUMENTS

JP 11-239224 8/1999

(Continued)

Primary Examiner—George Eng
Assistant Examiner—Un C. Cho
(74) Attorney, Agent, or Firm—Jordan and Hamburg LLP

(57) ABSTRACT

A wireless call system enables even a bedridden person to easily answer a visitor. The wireless call system has an outdoor unit (3) installed on the outside of an entrance of a structure having a door (13) lockable with an electronic lock (15), for calling a resident in the structure, and an indoor unit (9) connected to the outdoor unit (3) by radio, for informing the resident of the presence of a visitor upon receiving a signal from the outdoor unit (3) and allowing the resident to answer the visitor through the outdoor unit (3). The outdoor unit (3) has an image pickup unit (23) for picking up an image of the visitor making a call with the outdoor unit (3). The indoor unit (9) is portable and has a display (53) for displaying the visitor's image picked up by the image pickup unit (23) and control buttons (55) for unlocking the electronic lock (15) if necessary. The resident can carry the indoor unit (9) to an optional location, and at the location, check the visitor displayed on the display (53) and unlock the electronic lock (15) through the control buttons (55) after checking the visitor.

4 Claims, 5 Drawing Sheets

U.S. PATENT DOCUMENTS

| | | | |
|---|---|---|---|
| 6,590,176 B2 * | 7/2003 | Cole et al. | 200/341 |
| 6,628,812 B1 * | 9/2003 | Setlak et al. | 382/151 |
| 6,721,408 B1 * | 4/2004 | Bain et al. | 379/159 |
| 2004/0012482 A1 | 1/2004 | Yamagishi | |

FOREIGN PATENT DOCUMENTS

| | | |
|---|---|---|
| JP | 2002-155650 | 5/2002 |

* cited by examiner

FIG.5
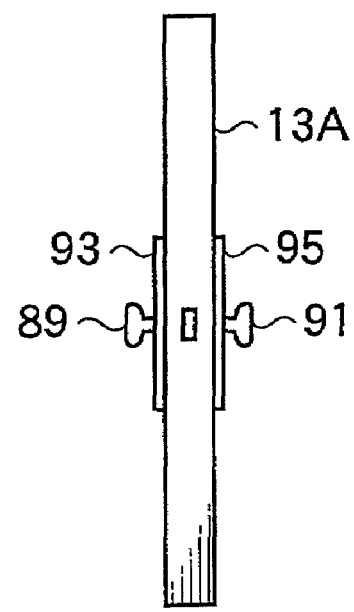
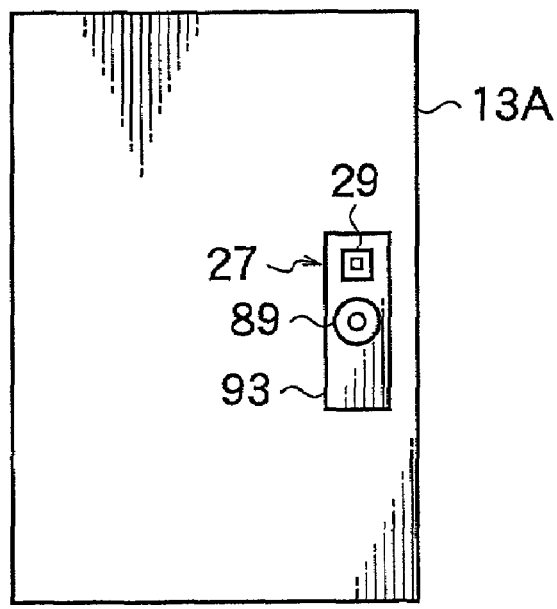
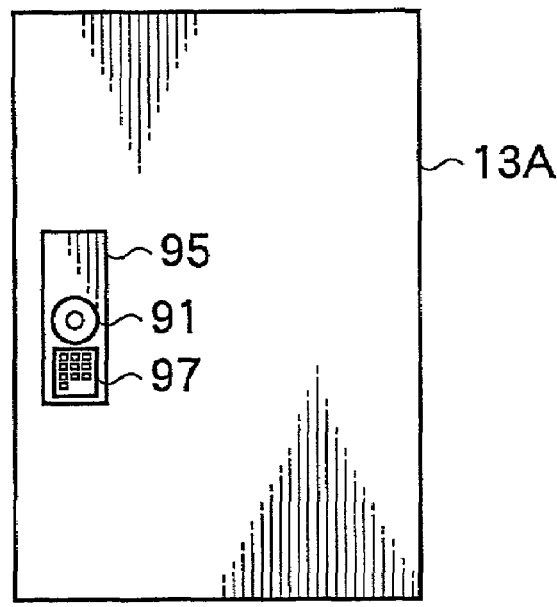

WIRELESS CALL SYSTEM

BACKGROUND OF THE INVENTION

1. Field of the Invention

The present invention relates to a wireless call system for checking visitors applicable to, for example, housing.

2. Description of the Related Art

An example of a conventional wireless call system is disclosed in Japanese Unexamined Patent Publication No. 11-239224. This system includes an indoor unit for checking a visitor. With the system, a resident in a house can check a visitor, unlock a door, and invite the visitor into the house without compromising security.

Conventional wireless call systems of the type mentioned above employ fixed indoor units. Whenever a visitor comes to operate an outdoor unit of the system, a resident in the house for which the system is installed must go to the indoor unit in the house to check the visitor. The resident may be a bedridden person or a person who is in bed with a cold. In this case, it is hard for the resident to go to the indoor unit every time a visitor comes, and if no answer is returned to the visitor from inside the house and if the door is locked, the visitor will leave without result. In this way, the conventional wireless call systems are unable to allow bedridden persons or persons in bed with sick to properly answer visitors.

BRIEF SUMMARY OF THE INVENTION

An object of the present invention is to provide a wireless call system capable of allowing, for example, a bedridden person easily check a visitor and unlock a door if necessary.

In order to accomplish the object, a first aspect of the present invention provides a wireless call system including an outdoor unit installed on the outside of an entrance of a structure having a door lockable with a lock unit, for calling a resident in the structure, and an indoor unit connected to the outdoor unit by radio, for informing the resident of the presence of a visitor upon receiving a signal from the outdoor unit and allowing the resident to answer the visitor through the outdoor unit. The outdoor unit has an image pickup unit for picking up an image of the visitor who makes a call with the outdoor unit. The indoor unit is portable and has a display unit for displaying the visitor's image picked up by the image pickup unit and an unlock unit for unlocking the lock unit. The resident may carry the indoor unit to an optional location, and at the location, may check the visitor displayed on the display unit and unlock the lock unit through the unlock unit after checking the visitor.

A second aspect of the present invention provides the wireless call system of the first aspect with a message taking unit and a message playback unit. The message taking unit is installed in the outdoor unit, to take a message from a visitor. The message playback unit is installed in the indoor unit, to play back the visitor's message taken by the message taking unit.

A third aspect of the present invention provides the wireless call system of the first aspect with an image recording unit. The image recording unit is installed in the indoor unit, to record the visitor's image picked up by the image pickup unit, so that the recorded image may be displayed by the display unit.

A fourth aspect of the present invention provides the wireless call system of the second aspect with an image recording unit and a message recording unit. The image recording unit is installed in the indoor unit, to record the visitor's image picked up by the image pickup unit, so that the recorded image may be displayed by the displayed unit. The message recording unit is installed in the indoor unit, to record the visitor's message taken by the message taking unit, so that the recorded message may be played back by the message playback unit.

A fifth aspect of the present invention provides the wireless call system of any one of the first to fourth aspects with a biometric information input unit and an unlock control unit. The biometric information input unit is installed in the outdoor unit, to input biometric information on a visitor. The unlock control unit unlocks the lock unit if the biometric information input through the biometric information input unit agrees with registered biometric information.

A sixth aspect of the present invention employs a fingerprint input unit as the biometric information input unit of the fifth aspect. According to the sixth aspect, the unlock control unit unlocks the lock unit if a fingerprint input through the fingerprint input unit agrees with a registered fingerprint. A part of the outdoor unit is made of conductive material and is grounded, so that the part is touched by a person before inputting his or her fingerprint into the fingerprint input unit, to release static electricity from him or her.

A seventh aspect of the present invention makes the conductive material of the sixth aspect from any one of nonconductive resin mixed with conductive metal powder, nonconductive resin mixed with carbon fiber, and conductive resin.

An eighth aspect of the present invention employs a fingerprint input unit as the biometric information input unit of the fifth aspect. According to the eighth aspect, the unlock control unit unlocks the lock unit if a fingerprint input through the fingerprint input unit agrees with a registered fingerprint. A part of the outdoor unit is made of conductive material and is grounded, so that a person who intends to input a fingerprint into the fingerprint input unit may touch the part of the outdoor unit to release static electricity from him or her beforehand. The part of the outdoor unit may be a call button used to make a call, or a message button used to input a message.

A ninth aspect of the present invention employs a fingerprint input unit as the biometric information input unit of the fifth aspect. According to the ninth aspect, the unlock control unit unlocks the lock unit if a fingerprint input through the fingerprint input unit agrees with a registered fingerprint. A part of the outdoor unit is made of conductive material and is grounded, so that a person who intends to input a fingerprint into the fingerprint input unit may touch the part of the outdoor unit to release static electricity from him or her beforehand. The conductive material is made from any one of nonconductive resin mixed with conductive metal powder, nonconductive resin mixed with carbon fiber, and conductive resin. The part of the outdoor unit may be a call button used to make a call, or a message button used to input a message.

According to the first aspect of the present invention, a visitor may call a resident through the outdoor unit. At this time, the image pickup unit picks up an image of the visitor. The resident receives a signal from the outdoor unit through the indoor unit connected to the outdoor unit by radio, to recognize the presence of the visitor. The resident may carry the indoor unit to an optional location and check the visitor's image on the display unit. After checking the visitor, the resident may unlock the lock unit of the door through the unlock unit in the indoor unit. Anywhere in the house, the resident can easily check a visitor with an image of the visitor on the indoor unit. According to a result of the checking, the resident may unlock the lock unit of the door. The resident can easily ensure and ease security. Even a bedridden person can check a visitor with an image of the visitor and invite only a proper visitor into the resident's room.

In addition to the effect of the first aspect, the second aspect of the present invention provides the outdoor unit with the message taking unit for taking a message from a visitor and the indoor unit with the message playback unit for playing back the message taken by the message taking unit. With these arrangements, the resident can easily check visitors' messages with the indoor unit at hand.

In addition to the effect of the first aspect, the third aspect of the present invention provides the indoor unit with the image recording unit for recording a visitor's image picked up by the image pickup unit. The recorded image is displayable on the display unit, so that the resident may easily check a visitor who came during the absence of the resident.

In addition to the effect of the second aspect, the fourth aspect of the present invention provides the indoor unit with the image recording unit for recording a visitor's image picked up by the image pickup unit and the message recording unit for recording a visitor's message taken by the message taking unit. The display unit is capable of displaying the recorded image in the image recording unit, and the message playback unit is capable of playing back the recorded message in the message recording unit. With these arrangements, the resident can check the image and message of a visitor who came during the absence of the resident, or can check a message left by a visitor the resident does not want to see.

In addition to the effect of any one of the first to fourth aspects, the fifth aspect of the present invention provides the indoor unit with the biometric information input unit for inputting visitor's biometric information and employs the unlock control unit for controlling the unlock unit to unlock the lock unit if the biometric information input through the biometric information input unit agrees with registered biometric information. The fifth aspect controls the unlock unit according to biometric information, thereby ensuring security and realizing keyless entry to the house.

In addition to the effect of the fifth aspect, the sixth aspect of the present invention employs a fingerprint input unit as the biometric information input unit. According to the sixth aspect, the unlock control unit unlocks the lock unit if a fingerprint input through the fingerprint input unit agrees with a registered fingerprint. A part of the outdoor unit is made of conductive material and is grounded, so that a person who intends to input a fingerprint into the fingerprint input unit may touch the part of the outdoor unit to release static electricity from the person beforehand. When a person inputs a fingerprint into the fingerprint input unit, the sixth aspect allows the person to release static electricity from the person, to secure correct fingerprint collation.

In addition to the effect of the sixth aspect, the seventh aspect of the present invention makes the conductive material of the sixth aspect from any one of nonconductive resin mixed with conductive metal powder, nonconductive resin mixed with carbon fiber, and conductive resin. The seventh aspect gradually and surely releases static electricity from a person manipulating the biometric information input unit through the part made of the conductive material.

In addition to the effect of the fifth aspect, the eighth aspect of the present invention employs a fingerprint input unit as the biometric information input unit. According to the eighth aspect, the unlock control unit unlocks the lock unit if a fingerprint input through the fingerprint input unit agrees with a registered fingerprint. A part of the outdoor unit is made of conductive material and is grounded, so that a person who intends to input a fingerprint into the fingerprint input unit may touch the part of the outdoor unit to release static electricity from the person beforehand. With these arrangements, a person can input his or her fingerprint into the fingerprint input unit free from static electricity, thereby preventing the malfunction and damage of the fingerprint input unit and realizing correct fingerprint collation. According to the eighth aspect, the part of the outdoor unit may be a call button used to make a call, or a message button used to input a message. For a person manipulating the fingerprint input unit, the call button or message button is a clear guide to simply and surely release static electricity from the person. Without adding a special part, the call button or message button is usable as the static electricity releasing part according to the eighth aspect, thereby simplifying the wireless call system.

In addition to the effect of the fifth aspect, the ninth aspect of the present invention employs a fingerprint input unit as the biometric information input unit. According to the ninth aspect, the unlock control unit unlocks the lock unit if a fingerprint input through the fingerprint input unit agrees with a registered fingerprint. A part of the outdoor unit is made of conductive material and is grounded, so that a person who intends to input a fingerprint into the fingerprint input unit may touch the part of the outdoor unit to release static electricity from the person. With these arrangements, a person can input his or her fingerprint into the fingerprint input unit free from static electricity, thereby preventing the malfunction and damage of the fingerprint input unit and realizing correct fingerprint collation. The conductive material is made from any one of nonconductive resin mixed with conductive metal powder, nonconductive resin mixed with carbon fiber, and conductive resin. This gradually and surely releases static electricity from a person who intends to manipulate the biometric information input unit. This conductive-material part of the outdoor unit may be a call button used to make a call, or a message button used to input a message. For a person manipulating the fingerprint input unit, the call button or message button is a clear guide to simply and surely release static electricity from the person. Without adding a special part, the call button or message button is usable as the static electricity releasing part according to the ninth aspect, thereby simplifying the wireless call system.

BRIEF DESCRIPTION OF THE DRAWINGS

FIGS. 5A, 5B, 5C are side, front, and back views showing a door employing a wireless call system according to a second embodiment of the present invention.

DETAILED DESCRIPTION OF THE INVENTION

Various embodiments of the present invention will be described with reference to the accompanying drawings.

Figure 1:
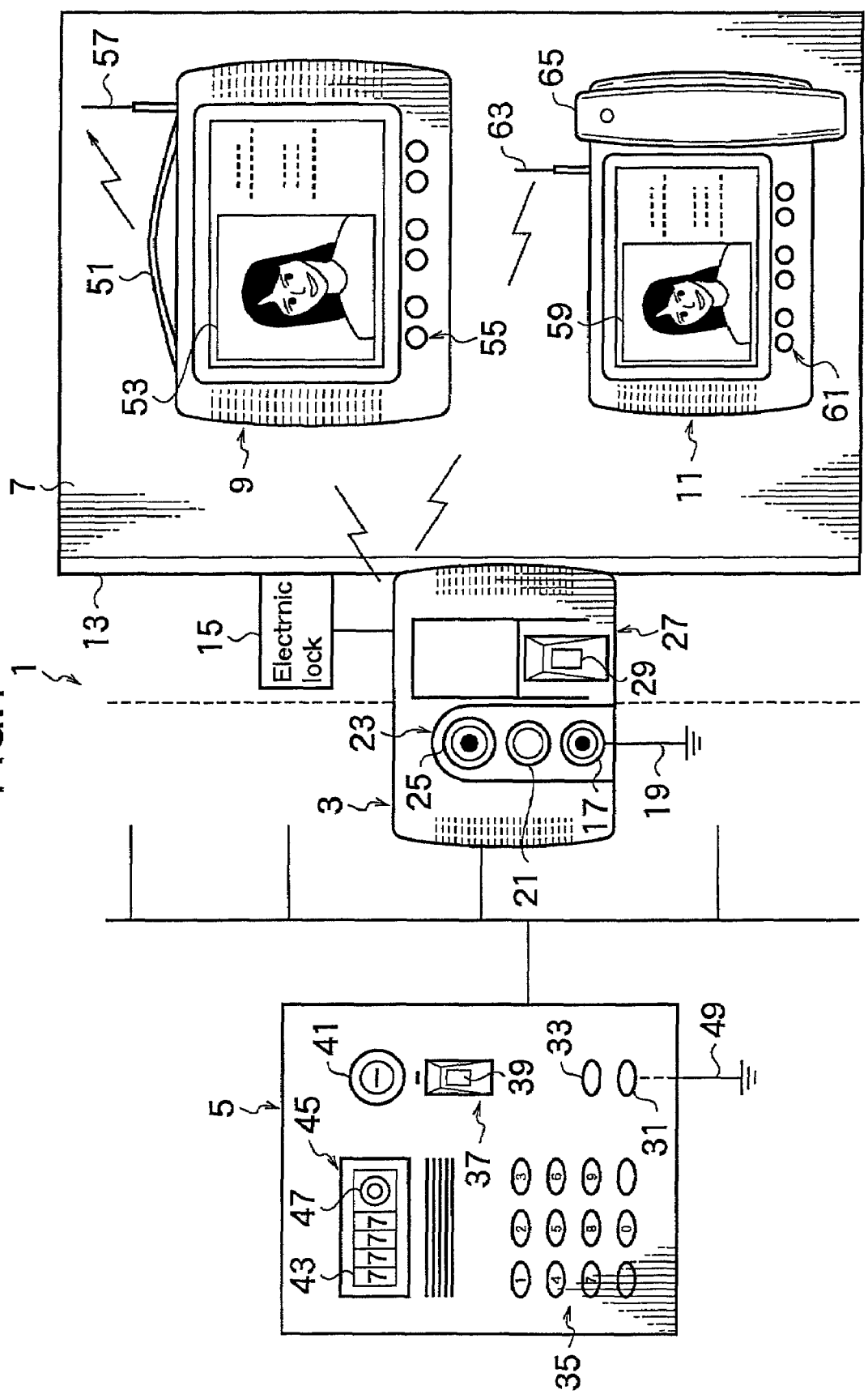
FIG. 1 is a general view schematically showing a wireless call system according to a first embodiment of the present invention.

FIG. 1 is a general block diagram schematically showing a wireless call system according to the first embodiment of the present invention. The wireless call system 1 is applied to, for example, collective housing such as a condominium. The wireless call system 1 has an individual outdoor unit 3 provided for each home in the collective housing and a central call unit 5 installed at the entrance of the collective housing. The wireless call system 1 also has indoor units arranged in each home or room 7. The indoor units include a portable indoor unit 9 and a fixed indoor unit 11. The entrance of the room 7 has a door 13 that is lockable with an electronic lock 15 serving as lock means.

The outdoor unit 3 is provided for each home or room in the collective housing, to call a resident in the home or room 7. The outdoor unit 3 has a control section including, for example, a call button 17 and a message input button 21. The call button 17 is pushed by a visitor to make a call. The call button 17, which is a part of the outdoor unit 3, is made of conductive material such as nonconductive resin mixed with conductive metal powder, nonconductive resin mixed with carbon fiber, or conductive resin and is grounded through a ground line 19. The message input button 21 allows a visitor, while pushing the button 21, to input a message. Instead of grounding the call button 17, the message input button 21 may be made of conductive material that is grounded.

The outdoor unit 3 also has a camera 25 in a camera unit 23 serving as image pickup means. The camera 25 is exposed from the outdoor unit 3. The camera unit 23 has an image sensor, etc., and its operation is interlocked with the pushing of the call button 17. The outdoor unit 3 has a fingerprint input unit 27 serving as biometric information input means. The fingerprint input unit 27 has a fingerprint input pad 29 on the outer face of the outdoor unit 3. The outdoor unit 3 is connected to the central call unit 5 through a LAN.

The central call unit 5 is installed on the outside of an entrance door of the collective housing. On the outer face of the central call unit 5, there are a call button 31, a message input button 33, a ten-key pad 35, a fingerprint input unit 37 serving as biometric information input means and having a fingerprint input pad 39, a keyhole 41, a display 43, and a camera unit 45 serving as image pickup means and having a camera 47. The operation of the camera unit 45 is interlocked with the pushing of the call button 31.

Like the call button 17 of the outdoor unit 3, the call button 31 is made of conductive material such as nonconductive resin mixed with conductive metal powder, nonconductive resin mixed with carbon fiber, or conductive resin and is grounded through a ground line 49.

The portable indoor unit 9 has a grip 51 with which a person can carry the portable indoor unit 9. The portable indoor unit 9 is connected to the outdoor unit 3 by radio, to receive a signal from the outdoor unit 3 so that a resident in the room 7 may recognize the presence of a visitor and respond to the outdoor unit 3. The portable indoor unit 9 has a display 53, various control buttons 55, and an RF antenna 57 of an RF unit.

The display 53 displays a visitor's image taken by the camera unit 23. The display 53 may display the date of a visit, the time of the visit, whether or not a message is left, etc.

The buttons 55 are properly pushed to serve as unlock means to unlock the electronic lock 15 and as means to respond to the outdoor unit 3 and central call unit 5 with voice. The buttons 55 are selectively operated to display images on the display 53 in real time, play back recorded images, or play back recorded messages if any.

The RF antenna 57 realizes radio communication with the outdoor unit 3.

The fixed indoor unit 11 is fixed, for example, on the wall in the room 7 in the vicinity of, for example, the door 13. Like the portable indoor unit 9, the fixed indoor unit 11 has a display 59, various control buttons 61, and an RF antenna 63. The fixed indoor unit 11 has a handset 65 to communicate with the outdoor unit 3 and central call unit 5. The fixed indoor unit 11 has a server function to transfer visitor's image and message to a cellular phone, etc.

Figure 2:
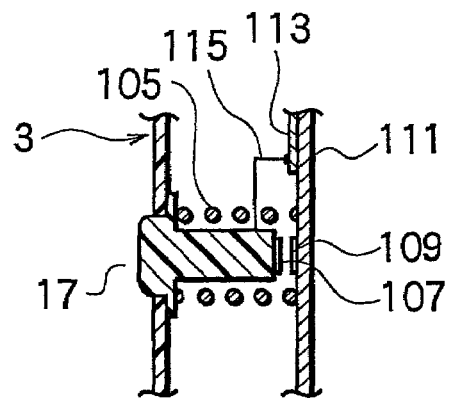
FIG. 2 is a sectional view schematically showing a call button according to the first embodiment.

FIG. 2 shows an example of the call button 17. The call button 17 is pushed by a spring 105 and has a movable contact 107. A base 111 has a fixed contact 109. When the call button 17 is pushed, the movable contact 107 comes in contact with the fixed contact 109. As a result, a call signal is sent from the outdoor unit 3. The call button 17 is connected to a conductive part 113 on the base 111 through a connection line 115. The conductive part 113 is grounded through the ground line 19. As a result, a person who touches the call button 17 can release static electricity from his or her finger through the connection line 115, conductive part 113, and ground line 19.

Figure 3:
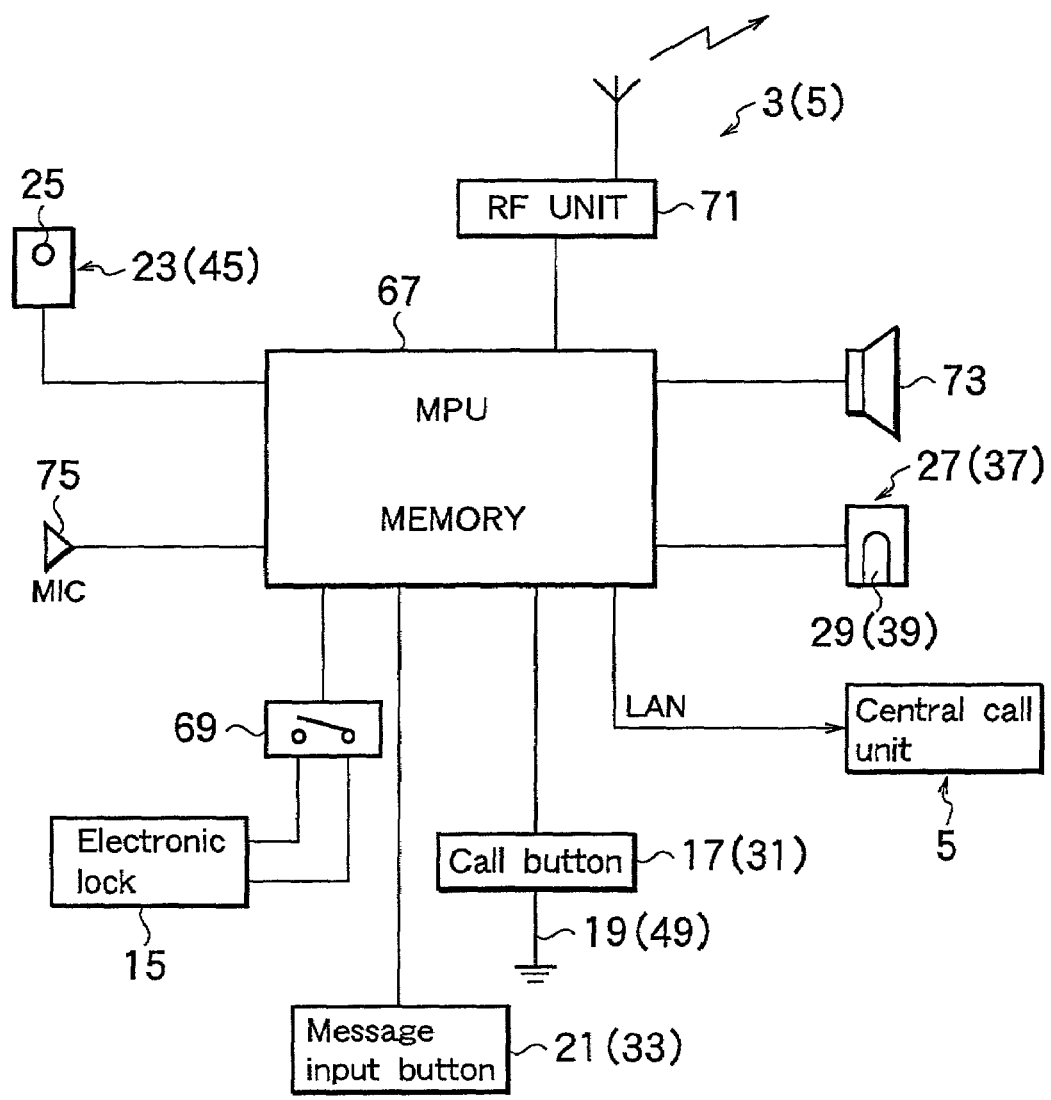
FIG. 3 is a block diagram schematically showing an outdoor unit provided for an individual house or room, according to the first embodiment.

FIG. 3 is a block diagram showing the circuitry of the outdoor unit 3. The outdoor unit 3 has a controller 67 including an MPU, a memory, etc. The controller 67 is connected to the call button 17, message input button 21, camera unit 23, and fingerprint input unit 27.

The electronic lock 15 is connected to the controller 67 through a drive circuit 69. The controller 67 sends a signal to the drive circuit 69 if a fingerprint input through the fingerprint input pad 29 agrees with a registered fingerprint, to unlock the electronic lock 15 serving as lock means. Consequently, the controller 67 serves as unlock control means. The controller 67 is connected to an RF unit 71 for radio communication.

The outdoor unit 3 further has a speaker 73 for audio output and a microphone 75 for audio input. The speaker 73 and microphone 75 are connected to the controller 67. The microphone 75 operates while the message input button 21 is being pushed, to take a visitor's message. According to the embodiment, the microphone 75 serves as message taking means.

The circuit structure of the central call unit 5 is substantially the same as the outdoor unit 3. Referring to FIG. 3, the central call unit 5 has a controller 67, a microphone 75, a speaker 73, etc. The reference numerals representing parts of the central call unit 5 in FIG. 1 are shown in FIG. 3 with parentheses, to correspond the parts of the central call unit 5 between FIGS. 1 and 3.

Figure 4:
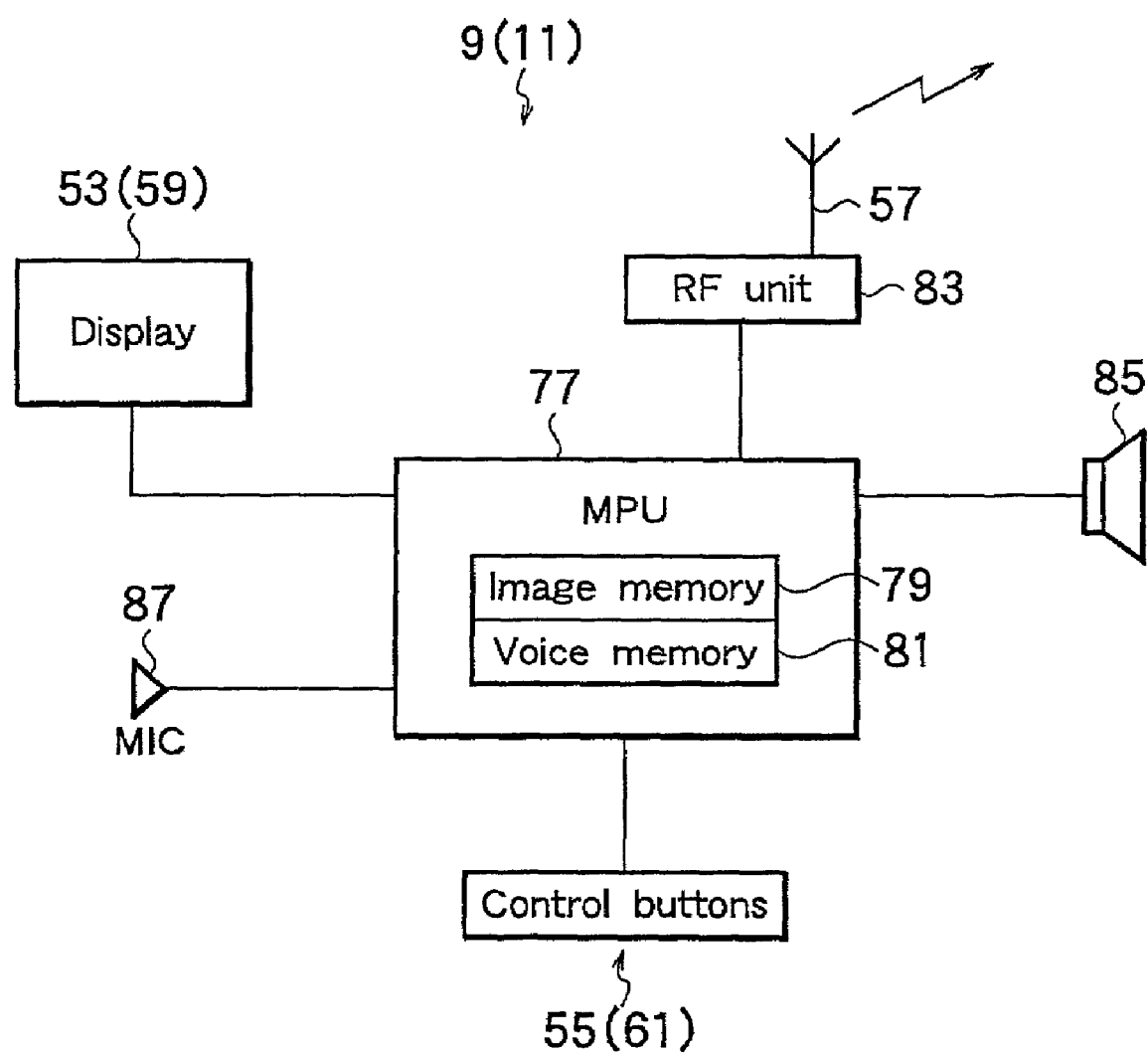
FIG. 4 is a block diagram schematically showing a portable indoor unit according to the first embodiment.

FIG. 4 is a block diagram showing an example of the internal structure of the portable indoor unit 9. The portable indoor unit 9 has a controller 77 having an MPU, an image memory 79, a voice memory 81, etc. The image memory 79 serves as image recording means for recording a visitor's image taken by the camera unit 23. The voice memory 81 serves as message recording means for recording a visitor's message taken by the microphone 75.

The controller 77 is connected to an RF unit 83 having the RF antenna 57. The controller 77 is connected to a speaker 85 and a microphone 87. The speaker 85 can output a call made by pushing the call button 17, so that the resident may prepare for a voice response. The speaker 85 can also play back messages recorded in the voice memory 81. According to the embodiment, the speaker 85 serves as message playback means. The microphone 87 is used to input voice for a voice response with respect to the outdoor unit 3 and central call unit 5.

The circuit structure of the fixed indoor unit 11 is substantially the same as that of the portable indoor unit 9. Referring to FIG. 4, the fixed indoor unit 11 has a controller 77, a microphone 87, a speaker 85, etc. The reference numerals representing parts of the fixed indoor unit 11 in FIG. 1 are shown in FIG. 4 with parentheses, to correspond the parts of the fixed indoor unit 11 between FIGS. 1 and 4.

If a person entering the entrance of the collective housing such as a condominium is one of the residents of the collective housing, the person inserts a key into the keyhole 41 if he or she possesses the key, to open the entrance door. Even if the person does not possess the key, he or she may put a specific finger on the fingerprint input pad 39 to input a fingerprint. If the input fingerprint agrees with a registered fingerprint, the entrance door is unlocked to guide the person into the housing.

When inputting a fingerprint into the fingerprint input pad 39, a person pushes the call button 31 beforehand, to remove static electricity from him or her through the ground line 49. This prevents the malfunction or damage of the fingerprint input pad 39 due to static electricity, thereby correctly capturing a fingerprint.

A person entered the housing through the entrance may enter the room 7. In this case, the person may use a home key to unlock the electronic lock 15, or input a fingerprint with the fingerprint input pad 29. If the input fingerprint agrees with a registered fingerprint, the electronic lock 15 is unlocked without a key. With the electronic lock 15 unlocked, the person can open the door 13 and enter the room 7.

Before manipulating the fingerprint input pad 29, the person touches the call button 17 as mentioned above, to remove static electricity from the person's finger through the ground line 19. This ensures a fingerprint input operation on the fingerprint input pad 29. Removing static electricity is also achievable by providing the fingerprint input pad 29 with a cover and a conductive plate at a location where a person naturally touches the conductive plate with his or her finger when opening the cover. Through a natural gesture during a fingerprint input motion on the fingerprint input pad 29, static electricity will be removed.

If a person who operates the central call unit 5 is a visitor, the visitor inputs a room number with the ten-key pad 35 at the entrance. The input room number is displayed on the display 43.

Thereafter, the visitor pushes the call button 31 to activate radio communication with the portable indoor unit 9 and fixed indoor unit 11 through the outdoor unit 3 of the room corresponding to the input room number. This results in, for example, ringing a bell. At this time, the visitor is photographed by the camera 47 of the camera unit 45, and a corresponding image signal is radioed to the portable indoor unit 9 and fixed indoor unit 11 through the outdoor unit 3.

The resident in the room 7 manipulates the control buttons 55 on the portable indoor unit 9, or the control buttons 61 on the fixed indoor unit 11, to display the visitor's image on the display 53 of the portable indoor unit 9 or the display 59 of the fixed indoor unit 11.

After checking the visitor's image, the resident in the room 7 manipulates the control buttons 55 or 61 to tell the visitor through the central call unit 5 that the entrance door will be opened. Then, the resident selectively operates the control buttons 55 or 61 to unlock the entrance door. As a result, the visitor can enter the collective housing through the entrance. At this time, the microphones 75 and 87 and speakers 73 and 85 are used to carry out voice communication between the central call unit 5 and the portable indoor unit 9 or fixed indoor unit 11.

The visitor entered the collective housing pushes, if necessary, the call button 17 on the outdoor unit 3 of the home to visit. At this time, the visitor is photographed with the camera 25 of the camera unit 23, and a corresponding image signal is radioed to the portable indoor unit 9 and fixed indoor unit 11.

As mentioned above, the resident in the room 7 displays the visitor's image on the display 53 of the portable indoor unit 9 or the display 59 of the fixed indoor unit 11, to check the visitor. After checking the visitor, the resident may determine to invite the visitor into the room 7. In this case, the resident manipulates the control buttons 55 on the portable indoor unit 9 or the control buttons 61 on the fixed indoor unit 11, to output a signal to the outdoor unit 3. In response to the signal, the outdoor unit 3 instructs the drive circuit 69 to unlock the electronic lock 15. Then, the visitor opens the door 13 and enters the room 7. The electronic lock 15 may be unlocked by directly manipulating a knob from the inside of the room 7.

When unlocking the electronic lock 15 through the portable indoor unit 9 or fixed indoor unit 11, the resident manipulates the control buttons 55 or 61 to tell the visitor that the door 13 will be opened. The voice of the resident is picked up by the microphone 87 and is spoken from the speaker 73 of the outdoor unit 3. As a result, the visitor acknowledges that the electronic lock 15 of the door 13 will be unlocked. Other voice communication is also possible between the outdoor unit 3 and the portable indoor unit 9 or fixed indoor unit 11 through the microphones 75 and 87 and speakers 73 and 85.

If the visitor who pushes the call button 31 on the central call unit 5 or the call button 17 on the outdoor unit 3 receives no answer, the visitor may push the message input button 33 or 21 to input a message. The message is input with the microphone 75 of the central call unit 5 or outdoor unit 3. The input message is transmitted to the portable indoor unit 9 or fixed indoor unit 11 and is recorded into the voice memory 81. At the same time, a visitor's image is photographed as mentioned above and an image signal is transmitted and stored in the image memory 79.

In the case of collective housing, a visitor will not manipulate the call button 17 on the outdoor unit 3 if the entrance door of the collective housing is kept closed. However, a visitor may enter the collective housing together with a resident who manipulates the central call unit 5 and opens the entrance door. In this case, the outdoor unit 3 may be manipulated by the visitor irrespective of the manipulation of the central call unit 5. Then, a message or image related to the visitor will be recorded as mentioned above.

The recorded message and image may be displayed on the display 53 or 59 or played back by manipulating the control buttons 55 on the portable indoor unit 9 or the control buttons 61 on the fixed indoor unit 11. The message is played back through the speaker 85. Even if the resident is out when a visitor comes, the resident may easily check the visitor's image and message after returning to home.

The portable indoor unit 9 may be carried with the grip 51 to an optional location. Any ordinary person can bring the portable indoor unit 9 close to a bedridden person or a person who is sick in bed so that, even if a visitor comes when the person in bed is left alone in the room 7, the person in bed may check an image of the visitor on the display 53 and easily recognize who is the visitor. After checking the visitor, the person in bed operates the control buttons 55 to open the entrance door and unlock the electronic lock 15 to invite the visitor into the room 7.

This arrangement properly guides a visitor and prevents the visitor from leaving in vain when no answer is returned after pushing the button 31 or 17.

This arrangement enables a visitor to call a resident in the room 7 through the central call unit 5 or outdoor unit 3. At this time, the camera unit 23 or 45 picks up an image of the visitor. The resident handles the portable indoor unit 9 or fixed indoor unit 11 connected to the outdoor unit 3 by radio, to receive a signal from the outdoor unit 3 and recognize the presence of the visitor. The resident may carry the portable indoor unit 9 to an optional location and check the visitor with his or her image displayed on the display 53. After checking the visitor, the resident may unlock the door 13 through the portable indoor unit 9. Anywhere in the room 7, the resident can easily check a visitor with the portable indoor unit 9. After checking the visitor, the resident may quickly unlock the door. In this way, the resident can easily ensure and ease security with the wireless call system of the embodiment. Even a bedridden person can check a visitor with his or her image and properly guide only a correct visitor into the room 7.

The portable indoor unit 9 enables the resident to easily check a visitor's message in hand.

The portable indoor unit 9 and fixed indoor unit 11 enable the resident to check visitors' images and messages left during the absence of the resident.

The electronic lock 15 is unlocked when an input fingerprint agrees with a registered fingerprint. This ensures security and realizes keyless entry to the room 7.

Before inputting a fingerprint into the fingerprint input unit 27 or 37, a person can release static electricity from him or her, to prevent the malfunction or damage of the fingerprint input units 27 and 37 and secure correct fingerprint collation. The call buttons 17 and 31 are clear guides for a person to easily and surely release static electricity from him or her. Using the call buttons 17 and 31 as the static electricity releasing means simplifies the structure of the wireless call system of the first embodiment because no additional parts are needed to release static electricity.

The first embodiment employs the central call unit 5 so that the wireless call system of the first embodiment is applicable to collective housing such as a condominium. The central call unit 5 may be omitted to use the wireless call system of the present invention as a home intercom having an unlocking function. According to the first embodiment, the fingerprint input unit 27 is installed in the outdoor unit 3. Instead, the fingerprint input unit may be separated and installed in the door 13 like the second embodiment shown in FIGS. 5A to 5C.

FIGS. 5A to 5C show a wireless call system according to the second embodiment of the present invention, in which FIG. 5A is a side view showing a door 13A to which the wireless call system is applied, FIG. 5B is a front view showing the door 13A, and FIG. 5C is a back view showing the door 13A. The door 13A has an outside knob 89 and an inside knob 91. The outside knob 89 is supported with an outside support plate 93, and the inside knob 91 is supported with an inside support plate 95. The support plates 93 and 95 have a rotary motor key for carrying out lock and unlock operations with a motor.

Figure 6:
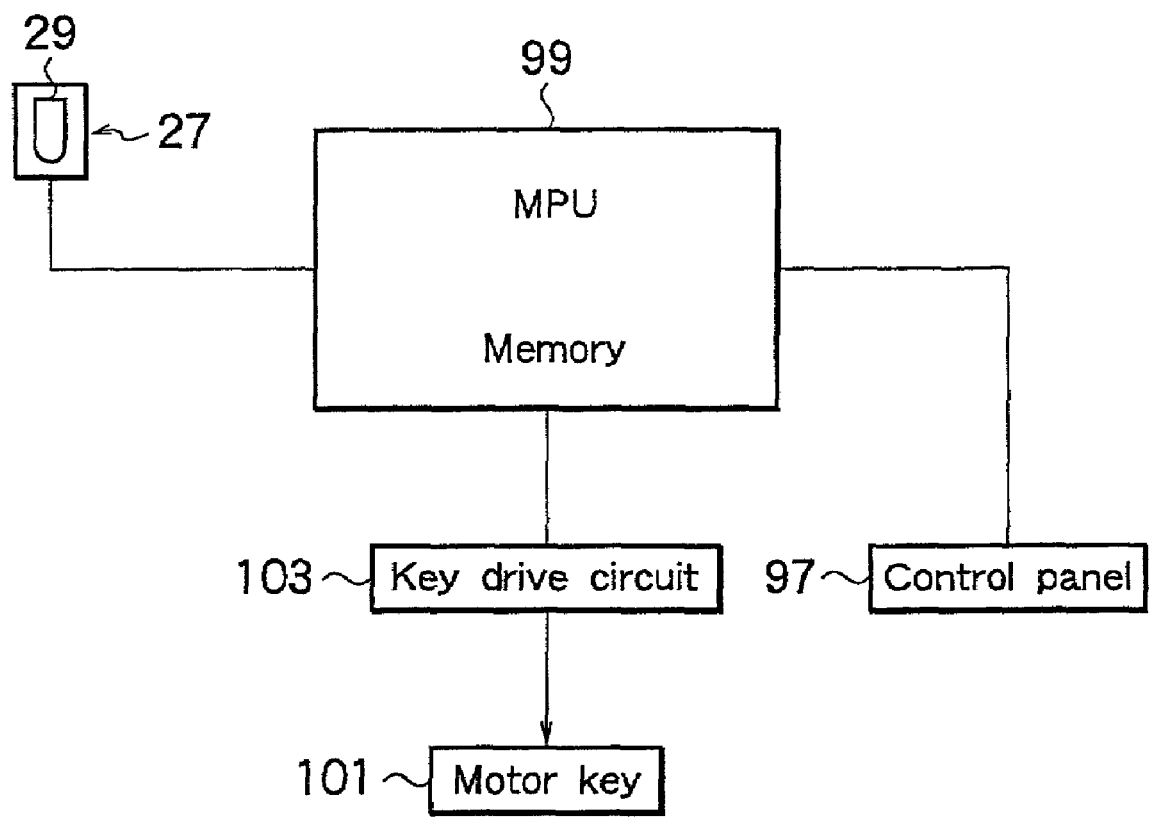
FIG. 6 is a block diagram showing a controller according to the second embodiment.

The outside support plate 93 has a fingerprint input unit 27 serving as biometric information input means having a fingerprint input pad 29. The inside support plate 95 has a control panel 97 for registering a fingerprint. FIG. 6 shows a controller 99 provided for the control panel 97 and having an MPU, a memory, etc. The controller 99 is connected to the fingerprint input pad 29 and control panel 97. The controller 99 is also connected to a key drive circuit 103 for the motor key 101. The controller 99 compares a finger print input through the fingerprint input pad 29 with a fingerprint stored in the memory, and if the fingerprints agree with each other, unlocks the motor key 101 serving as lock means. Accordingly, the controller 99 serves as unlock control means according to the second embodiment.

According to the second embodiment of FIGS. 5 and 6, a person inputs his or her fingerprint with the fingerprint input pad 29. If the input fingerprint agrees with a registered fingerprint, the controller 99 sends a signal to the key drive circuit 103 to drive the motor key 101 and unlock the door 13A. Then, the person can enter the room without a key. To register a fingerprint, a person inputs the fingerprint into the fingerprint input pad 29 and manipulates the control panel 97 to register the fingerprint in the memory.

According to the second embodiment, the fingerprint input unit 27, control panel 97, etc., can be assembled with the support plates 93 and 95 of the door knobs 89 and 91 into a single door knob unit. This door knob unit can be replaced with an existing door knob unit, to apply the present invention to a practical use.

The biometric information used by the present invention includes not only fingerprints but also irises, DNA, patterns on the backs of hands, etc. The part of the outdoor unit serving as the static electricity releasing means may be a cover provided for the fingerprint input unit. The cover is made of conductive material and is grounded. Alternatively, a part of the casing of the outdoor unit to which a person naturally touches when opening the cover of the fingerprint input unit may be made of conductive material and grounded to serve as the static electricity releasing means.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A wireless call system comprising:
    an outdoor unit installed on the outside of an entrance of a structure having a door lockable with lock means, the outdoor unit having a call button responsive to finger pressure and means responsive to the call button to make a call to a resident in the structure and a message input button, responsive to finger pressure, controlling a messaging means for inputting a message to the resident;
    an indoor unit connected to the outdoor unit by radio, for informing a resident of presence of a visitor upon receiving a signal from the outdoor unit and allowing the resident to answer the visitor through the outdoor unit;
    the outdoor unit having image pickup means for picking up an image of the visitor making a call with the outdoor unit;

the indoor unit being handheld configured to be held in hand and portable and having display means incorporated therein for displaying the visitor's image picked up by the image pickup means and unlock means for unlocking the lock means, the indoor unit being portable to an optional location and allowing, at the optional location, the resident to check the visitor displayed on the display means and, if necessary, unlock the lock means through the unlock means, the outdoor unit having fingerprint input means for inputting fingerprint information of the visitor, unlock control means for unlocking the lock means if the fingerprint information input through the fingerprint input means agrees with registered fingerprint information, the call button having a call button body formed of conductive material and grounded to effect static discharge in conjunction with finger depression to form an integrated static discharge and input button device, wherein the conductive material is any one of nonconductive resin mixed with conductive metal powder, nonconductive resin mixed with carbon fiber, and conductive resin, the outdoor unit having a housing including a front wall defining a call button aperture, and a base panel within said housing and opposing a front wall inner surface of the front wall, said base panel being a circuit board carrying contacts, the call button body being disposed in the call button aperture and having at least a portion thereof disposed between the front wall inner surface and the base panel, the body extending from the front wall inner surface toward the base panel and having a flange portion engageable with said front wall inner surface and a movable contact opposing said base panel, a spring interposed between the flange portion of the call button body and the base panel to bias the call button toward the front wall of the housing, the base panel having a panel front surface with a fixed contact disposed thereon opposite to the movable contact and a grounded conductive part also formed on the panel front surface, and the call button body being electrical connected by a connection line to the grounded conductive part.

2. The wireless call system of claim 1, wherein:

the outdoor unit has message taking means for taking a message from the visitor; and the indoor unit has message playback means for playing back the visitor's message taken by the message taking means.

3. The wireless call system of claim 2, wherein:

the indoor unit has image recording means for recording the visitor's image picked up by the image pickup means and message recording means for recording the visitor's message taken by the message taking means; and the display means is able to display the visitor's image recorded by the image recording means, and the message playback means is able to play back the visitor's message recorded by the message recording means.

4. The wireless call system of claim 1, wherein:

the indoor unit has image recording means for recording the visitor's image picked up by the image pickup means; and the display means is able to display the visitor's image recorded by the image recording means.

* * * * *